US008473848B2

(12) United States Patent
Bells et al.

(10) Patent No.: US 8,473,848 B2
(45) Date of Patent: Jun. 25, 2013

(54) PALETTE-BASED COLOR SELECTION WITHIN A USER INTERFACE THEME

(75) Inventors: Matthew Bells, Waterloo (CA); Julian Paas, Mississauga (CA)

(73) Assignee: Research In Motion Limited, Waterloo (CA)

( * ) Notice: Subject to any disclaimer, the term of this patent is extended or adjusted under 35 U.S.C. 154(b) by 1980 days.

(21) Appl. No.: 10/940,672

(22) Filed: Sep. 15, 2004

(65) Prior Publication Data

US 2006/0059430 A1 Mar. 16, 2006

(51) Int. Cl.
*G06F 3/00* (2006.01)

(52) U.S. Cl.
USPC ........... 715/744; 715/765; 715/747; 715/746; 715/745; 715/762

(58) Field of Classification Search
USPC ... 345/765, 581; 709/220; 707/513; 715/747, 715/765, 744, 762, 746
See application file for complete search history.

(56) References Cited

U.S. PATENT DOCUMENTS

| 5,615,320 | A | * | 3/1997 | Lavendel | 345/594 |
| 6,023,714 | A | * | 2/2000 | Hill et al. | 715/513 |
| 6,035,423 | A | * | 3/2000 | Hodges et al. | 714/38.1 |
| 2002/0039101 | A1 | | 4/2002 | Fernandez et al. | |
| 2003/0052921 | A1 | * | 3/2003 | Ulrich et al. | 345/765 |
| 2004/0003400 | A1 | | 1/2004 | Carney et al. | |
| 2005/0160155 | A1 | * | 7/2005 | Geekee et al. | 709/220 |

FOREIGN PATENT DOCUMENTS

WO  WO 03017077  2/2003

OTHER PUBLICATIONS

Microsoft Windows XP ("Microsoft" © 1981-2001) Figures 1-4.*
MicroSoft Windows XP fast and easy ; 2002; Stacy Hiquet pp. 184-186.*
Microsft Windows XP ( copyrighted 1981-2001).*
European Search Report corresponding to European Patent Application No. EP04104468.
Bos, Bert et al. "CSS 2.1 Chapter 4 Syntax and Basic Data Types" Cascading Style Sheets 2.1 Draft, Oct. 21, 2002.
Bos, Bert et al. "CSS 2.1 Chapter 18 User Interface" Cascading Style Sheets 2.1 Draft, Aug. 20, 2002.

* cited by examiner

*Primary Examiner* — Omar Abdul-Ali
*Assistant Examiner* — Sherrod Keaton
(74) *Attorney, Agent, or Firm* — Ridout & Maybee LLP

(57) ABSTRACT

Methods and devices that enable the customization of colors in a user interface by using a palette to define colors. The palette includes strings that have color values assigned to them. The strings are referred to in style sheets where color attributes are specified, such that colors can be redefined in the palette rather than in the style sheet.

21 Claims, 6 Drawing Sheets

```
                                                    210
<palette>
   <entry name="primary" color="#2949E7"/>
   <entry name="secondary" color="#7BB6F7"/>
   <entry name="tertiary" color="#DEDEDE"/>
</palette>
```

```
                                                    210
<palette>
   <entry name="primary" color="#FF0000"/>
   <entry name="secondary" color="#DEDEDE"/>
   <entry name="tertiary" color="#6BDBFF"/>
</palette>
```

```
                                          150
<attribute-set name="">
    <foreground color="black"/>
    <background color="#FFFFFF"/>
    <caret>
        <draw style="redraw"/>
        <foreground color="white"/>           } 212
        <background color="[primary]"/>
    </caret>
    <selection>
        <foreground color="black"/>
        <background color="[tertiary]"/>
    </selection>
</attribute-set>

<attribute-set name="application-description">
    <foreground color="[primary]"/>
    <background color="white"/>              } 214
    <font family="BBCondensed" size="12px" style="bold"/>
</attribute-set>

<attribute-set name="popup">
    <foreground color="white"/>
    <background color="[secondary]"/>
    <padding top="2" right="2" bottom="2" left="2"/>
    <border name="popup"/>
    <scroll up="menu_up_arrow" down="menu_down_arrow"/>  } 216
    <caret>
        <draw style="redraw"/>
        <foreground color="white"/>
        <background color="[primary]"/>
    </caret>
</attribute-set>

PALETTE-BASED COLOR SELECTION WITHIN A USER INTERFACE THEME

FIELD OF TECHNOLOGY

The present application relates to customizable user interfaces and, in particular, to the selection of colors within a user interface theme by means of a palette.

BACKGROUND INFORMATION

A graphical user interface on a mobile electronic device may be rendered on a display screen in accordance with a theme, which specifies the visual attributes associated with fields in the user interface. In some themes, different visual attributes may be associated with specific fields. Visual attributes may include things such as colours, fonts, font-size, font-weight, background images, etc. Accordingly, the theme governs the look-and-feel of the user interface. Different themes may be applied to change the look-and-feel of a user interface without affecting the substantive functioning of the interface.

When creating themes, it is common to assign the same color to multiple regions. However, it can then be quite laborious for a designer to subsequently adjust the colors of the multiple regions. Similarly, making a new theme that is similar to an existing theme but with different colors can be quite laborious as well.

It would be advantageous to provide for a method or device in which the colors associated with a theme could be adjusted or varied with relative ease.

BRIEF SUMMARY

The present application describes methods, devices, and computer program products that enable the customization of colors in a user interface by using a palette to define colors. The palette includes strings that have color values assigned to them. The strings are referred to in style sheets where color attributes are specified, such that colors can be redefined in the palette rather than in the style sheet.

In one aspect, the present application provides a method for defining colors for a graphical user interface having a plurality of interface elements each having visual attributes. The method includes: providing a color palette list that includes a plurality of variable strings each of which has assigned thereto a color value; providing a style sheet specifying color attributes of at least some of the interface elements, at least one of the color attributes of at least one of the interface elements being specified by reference to one of the variable strings; and generating the user interface with the at least some interface elements having colors in accordance with the specified color attributes.

In another aspect, the present application provides a mobile electronic device that includes a display screen for displaying a user interface with a plurality of display elements having color attributes, a storage, and a processor connected to the storage and to the display screen for controlling operation of the display screen. A color palette list is stored on the storage that includes a plurality of string variables that each have assigned thereto a color. An instruction set stored on the storage specifies color attributes of at least some of the display elements, at least some of the color attributes in the instruction set being specified by reference to the string variables. A theme manager is associated with the processor for setting the color attributes of the display elements to correspond to the specified color attributes.

In yet another aspect, the present application provides a computer program product having a computer-readable medium tangibly embodying computer executable instructions for customizing colors of display elements in a user interface, the computer executable instructions including: a color palette list that includes a plurality of variable strings each of which has assigned thereto a color value; and instructions specifying color attributes of at least some of the interface elements, at least one of the color attributes of at least one of the interface elements being specified by reference to one of the variable strings.

In yet another aspect, the present application provides a method of generating a user interface customization file for use by a device to customize the user interface of the device, the method including generating an instruction file that includes a color palette list that includes a plurality of strings each of which has assigned thereto a color value and a style sheet that specifies color attributes of at least some of the displayed elements, at least some of the color attributes being specified by reference to strings of the palette list.

BRIEF DESCRIPTION OF THE DRAWINGS

Embodiments of the present invention will now be described, by way of example only, with reference to the attached Figures, wherein:

FIG. 7 shows excerpts of a style sheet from the example user interface file;

Like reference numerals are used throughout the Figures to denote similar elements and features.

DETAILED DESCRIPTION

Figure 1:
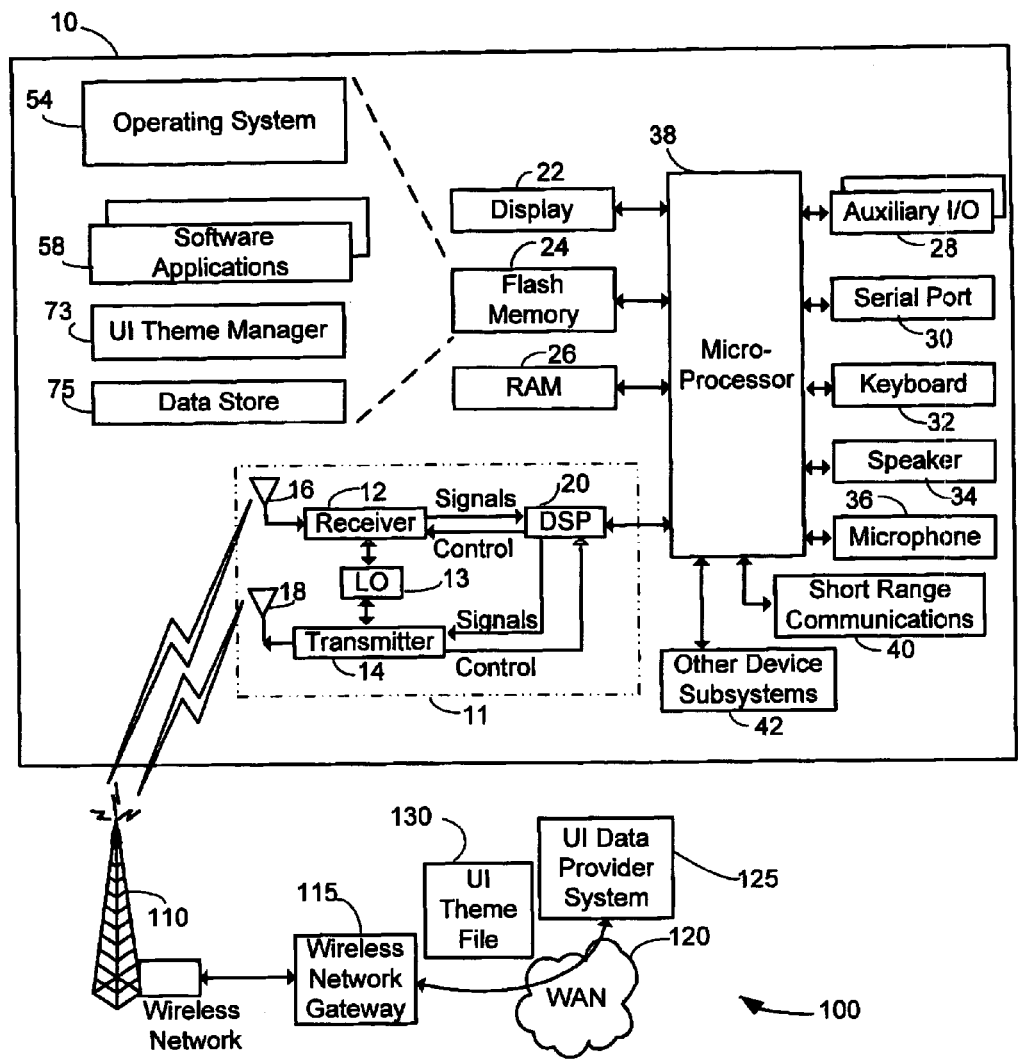
FIG. 1 is a block diagram of a mobile electronic device and a communications system to which embodiments of the present invention may be applied.

Referring to FIG. 1, there is a block diagram of a communication system 100 and mobile electronic device 10 to which example embodiments of the present invention may be applied. The communication system 100 includes mobile electronic devices 10 (only one of which is shown in FIG. 1), a wireless network 110 for communicating with the mobile electronic devices 10, a wireless network gateway 115 for interfacing the wireless network 110 with a Wide Area Network (WAN) 120, the WAN 120 connecting the wireless network gateway 115 with a User Interface (UI) data provider system 125.

The wireless network gateway 115 provides an interface between the wireless network 110 in which the devices 10 operate, and the WAN 120 in which the UI data provider system 125 is configured to operate. The WAN 120 can in various embodiments include the Internet, a direct connection, a local area network (LAN), a wireless communication link, and any combinations thereof. In some embodiments, data generated by the UI data provider system 125 may be provided to devices 10 through a direct link or through a data transfer means other than through WAN 120, gateway 115 and wireless network 110.

The UI data provider system 125 provides the data and/or instructions for customizing user interface presentation on the mobile electronic devices 10. More particularly, the UI data provider system provides information to mobile electronic devices 10 that can be used by such mobile electronic devices to customize or change the theme of the user interface that is presented by the device to a user. Theme refers to attributes of the visual components or elements of the user interface that affect the look, but not the underlying meaning or semantic content, of the visual components such as colors, fonts, icon look and size, background images, and logos, among other things. Theme-able attributes are those attributes of visual elements of the user interface that can be changed or customized based on information provided to the mobile electronic device 10 in a UI theme file 130.

In the embodiment of FIG. 1, the mobile electronic device 10 is a hand-held two-way mobile communication device 10 having at least data and possibly also voice communication capabilities. In an example embodiment, the device has the capability to communicate with other computer systems on the Internet. In various embodiments, mobile electronic devices 10 includes data communication devices, multiple-mode communication devices configured for both data and voice communication, mobile telephones, mobile communication devices, PDAs enabled for wireless communications, 1-way or 2-way pagers, wireless modems operating in conjunction with computer systems, and any type of mobile wireless communication devices. In the presently described embodiment, each of the mobile electronic devices 10 is configured to operate within the wireless network 110. It should be appreciated however that examples of the invention are in no way limited to these example types of devices and may be implemented in other devices with displays. Example embodiments may also be applied to non-wireless enabled devices.

The device 10 includes a communication subsystem 11, including a receiver 12, a transmitter 14, and associated components such as one or more antenna elements 16 and 18, and a processing module such as a digital signal processor (DSP) 20. In some embodiments, the communication subsystem includes local oscillator(s) (LO) 13, and in some embodiments the communication subsystem and microprocessor 38 share an oscillator. As will be apparent to those skilled in the field of communications, the particular design of the communication subsystem 11 will be dependent upon the communication network in which the device is intended to operate.

Signals received by the antenna 16 through a wireless communication network 110 are input to the receiver 12, which may perform such common receiver functions as signal amplification, frequency down conversion, filtering, channel selection and the like, and in some embodiments, analog to digital conversion. In a similar manner, signals to be transmitted are processed, including modulation and encoding for example, by the DSP 20 and input to the transmitter 14 for digital to analog conversion, frequency up conversion, filtering, amplification and transmission over the communications network 110 via the antenna 18.

The device 10 includes a microprocessor 38 that controls the overall operation of the device. The microprocessor 38 interacts with communications subsystem 11 and also interacts with further device subsystems such as the display 22, flash memory 24, random access memory (RAM) 26, auxiliary input/output (I/O) subsystems 28 (which may include a thumb-wheel, for example), serial port 30, keyboard or keypad 32, speaker 34, microphone 36, a short-range communications subsystem 40, and any other device subsystems generally designated as 42.

Some of the subsystems shown in FIG. 1 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

Operating system software 54 and various software applications 58 used by the microprocessor 38 are, in one example embodiment, stored in a persistent store such as flash memory 24 or similar storage element. Those skilled in the art will appreciate that the operating system 54, specific device applications 58, or parts thereof, may be temporarily loaded into a volatile store such as RAM 26. It is contemplated that received communication signals may also be stored to RAM 26.

The microprocessor 38, in addition to its operating system functions, in example embodiments also enables execution of software applications 58 on the device. A predetermined set of applications 58 which control basic device operations, including at least data and voice communication applications for example, will normally be installed on the device 10 during manufacture. Further applications may also be loaded onto the device 10 through the network 110, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communication subsystem 11 and input to the microprocessor 38, which will preferably further process the received signal for output to the display 22, or alternatively to an auxiliary I/O device 28. A user of device 10 may also compose data items such as email messages for example, using the keyboard 32 in conjunction with the display 22 and possibly an auxiliary I/O device 28. Such composed items may then be transmitted over a communication network through the communication subsystem 11.

The serial port 30, which may be a USB port, in FIG. 1 would normally be implemented in a personal digital assistant (PDA)-type communication device for which synchronization with a user's desktop computer (not shown) may be desirable. Such a port 30, if present, would enable a user to set preferences through an external device or software application and would extend the capabilities of the device by providing for information or software downloads, including user interface information, to the device 10 other than through a wireless communication network.

A short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices.

Wireless mobile network 110 is, in an example embodiment, a wireless packet data network, (e.g. Mobitex™ or DataTAC™), which provides radio coverage to mobile electronic devices 10, although it could be any other types of wireless networks.

Figure 2:
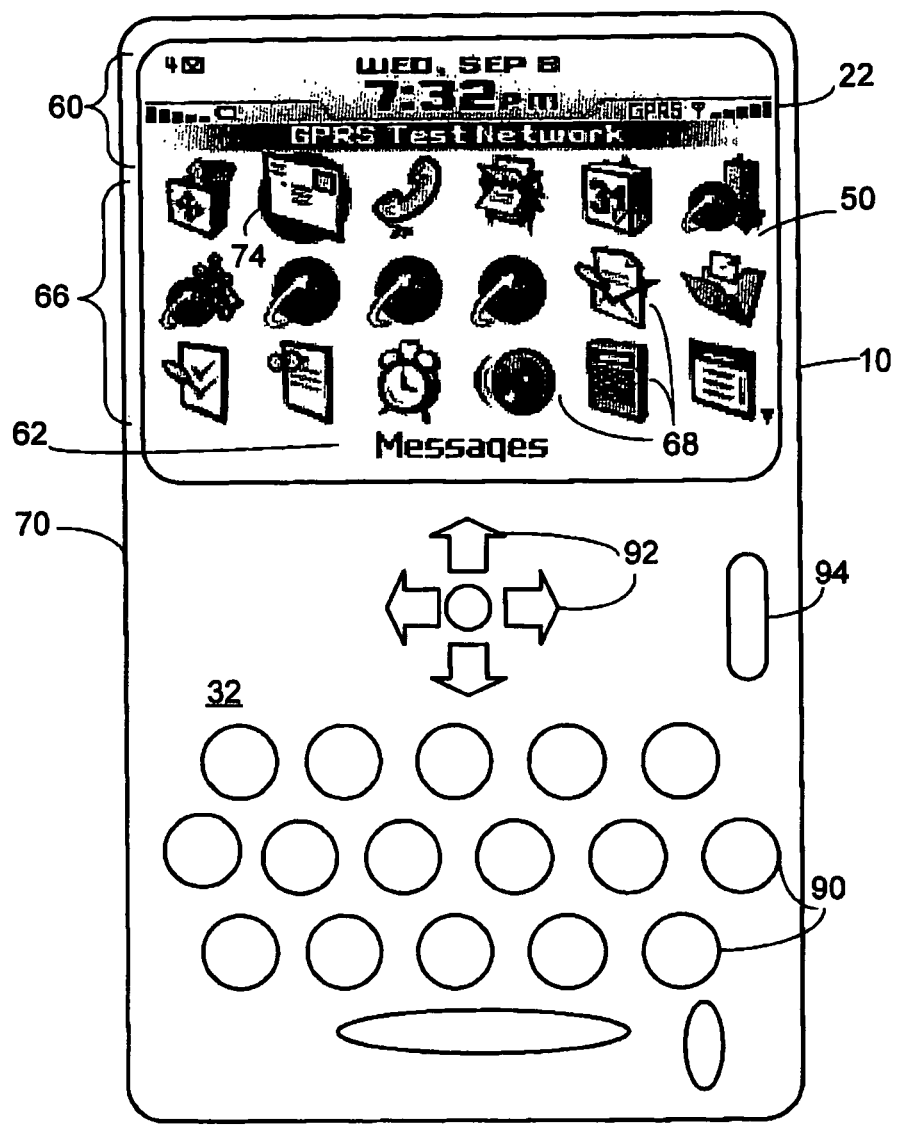
FIG. 2 is a front view of a mobile electronic device to which embodiments of the present invention may be applied.

With reference to FIG. 2, in an example embodiment, the components and subsystems of mobile electronic device 10 are housed within a hard plastic main body case 70 that is configured to be held with one or two hands while the device 10 is in use. The mobile electronic device 10 will typically be small enough to fit inside a standard purse or suit jacket pocket. The keyboard 32 includes buttons or keys 90, 92 positioned to be actuated by the thumbs or fingers of the user. In one example embodiment, alphanumeric keys 90 are arranged in a compressed QWERTY configuration, although other keyboard configurations or user input devices could be used with device 10.

As shown in FIG. 2, a graphical user interface 50 displayed on the display 22 of mobile electronic device 10 provides visual information to the user. In FIG. 2, a home or main screen user interface is shown from which various applications resident on the mobile electronic device 10 can be selected and launched. The main screen user interface 50 includes the following theme-able areas or sections: a title banner and status section 60, a selection banner 62 and a client section 66, each of which display one or more elements. In the illustrated embodiment, the title banner and status section 60 includes a coloured, for example red, band at the top of display 22, that includes a text element displaying the name of the carrier ("GPRS Test Network") that operates the home wireless network 110 that the device 10 operates in. Status information including, for example, date and time, an unread incoming message count, wireless network type (GPRS), received signal strength, and battery strength is also displayed in section 60. As can be seen from FIG. 2, status elements can include alphanumeric values and/or graphic images.

The client section 66 displays elements that include a number of selectable application and folder icons 68 that are presented on a background. The icons 68 can be "focused" or selected with a caret 74 (or other type of pointer) that moves around the client section 66 in response to user manipulation of navigation keys 92 and/or scrolling of thumb scroll wheel 94, and/or other predetermined user input. The application icons 68 may include, among other things, a mail messages icon, a phone application icon, an address book icon, a calendar icon, and a browser icon. Once an application icon 68 or a folder icon is focused with caret 74 it can be launched or opened by the user taking a predetermined action such as, for example, pressing a predetermined control key or pressing thumb scroll wheel 94. Such activity will typically result in a different graphic user interface being presented to the user on display 22. In the example shown in FIG. 2, the selection banner 62 displays the application description ("Messages") associated with the application or folder icon that is currently focused by caret 74.

According to an example embodiment of the invention, theme-able attributes of the user interface 50 can be customized. The presently described embodiment is particularly directed towards customizing colors in the user interface 50, including for example, foreground and background colors of elements.

Figure 3:
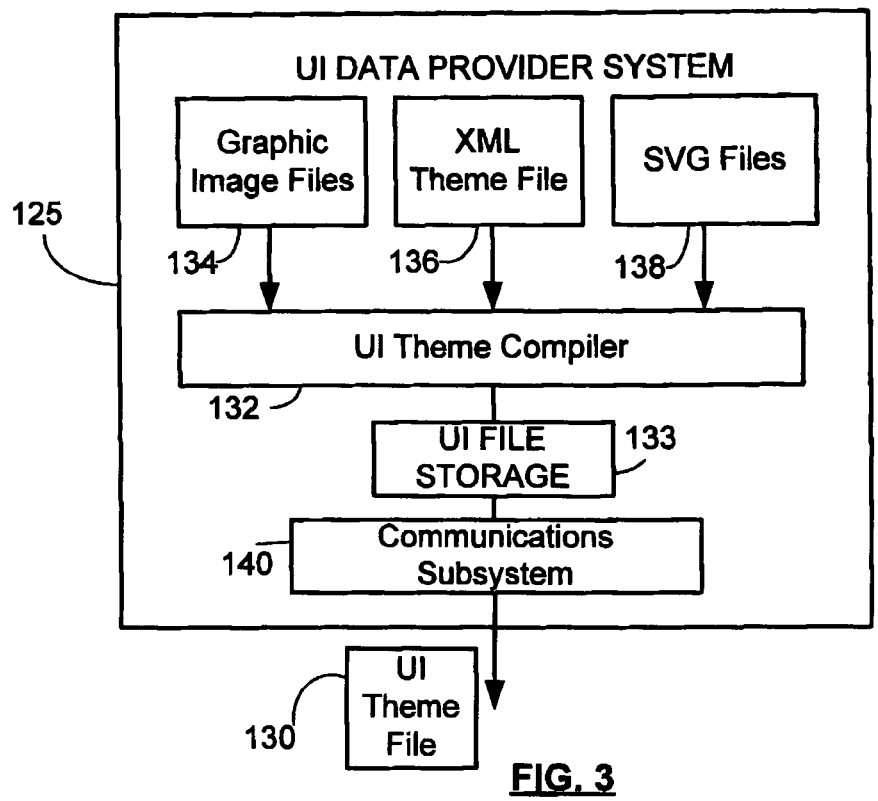
FIG. 3 is a block diagram of an example of a user interface data provider of the communication system of FIG. 1.

The theme-able attributes of user interface 50, including color, can be specified and customized based on user interface files 130 downloaded by the mobile electronic device 10 from UI data provider system 125. With reference to FIG. 3, UI data provider system 125 includes a theme compiler 132 that receives as inputs an instruction set in the form of XML (extensible Markup Language) file 136, and graphics files in the form of binary graphics files 134 and SVG (Scalable Vector Graphics) files 138. Based on the input files, the theme compiler 132 produces UI theme file 130, which may be stored on a UI file storage 133 at the UI provider system 125 and ultimately downloaded to one or more mobile electronic devices 10. In some embodiments, the theme compiler may produce the UI theme file 130 at one physical location or on one machine, and then it is stored in a UI file storage 133 or library for subsequent download at a separate physical location or on a separate machine. Thus, the functions of UI provider system 125 could be spread out over different physical locations or machines and performed at different times. In embodiments where the UI theme file 130 is downloaded through WAN 120 and wireless network 110, the UI provider system 125 includes an appropriate communication subsystem 140. The UI data provider system 140 includes such components as are required to communicate within the WAN 120. In embodiments where UI files can be requested from the UI data provider system, the communication subsystem 132 includes systems for processing such requests.

UI theme file 130 contains information required by the mobile electronic device 10 to implement a particular user interface theme. For example, the UI theme file 130 may include information required to customize the user interface 50 to a color, logo and icon scheme preferred by the carrier that operates the home wireless network 110 of mobile electronic device 10. In some embodiments, the UI theme file 130 may be purchasable file that includes information required to customize the user interface 50 to a color, logo and icon scheme associated with an organization such as a favoured team.

In various embodiments, one or more UI files 130 are provided to mobile electronic device 10 in response to requests for specific UI files 130 from the mobile electronic device. For example, the user of a mobile electronic device 10 may decide to download the UI theme file 130 associated with a specific theme—for example, a theme related to a favourite sports team. In other embodiments, one or more UI files 130 may be pre-loaded onto the device 10 prior to shipping of the device 10. In some embodiments, UI files 130 may be periodically pushed over wireless network 110 to selected devices 10 as part of system updating or maintenance performed by the wireless network carrier.

In some example embodiments, graphic image files 134 are bit mapped graphic files such as .gif (Graphics Interchange Format) or .png (portable network graphics). The bit mapped graphic image files define custom binary images associated with the theme defined by the UI file—for example, any custom logos, application icons, folder Icons, or status images. The SVG files 138 define in an SVG format the layout of some of the elements of the user interface theme, for example, a custom banner layout for the user interface. The SVG files 138 may not include all functions and features supported by SVG, but rather a sub-set of such functions and features. The bit-mapped graphic image files 134 and the SVG files 138 may be stored at the UI data provider system, or in other storage that is accessible to UI theme compiler 132. Other forms of graphic files may be used in other embodiments, for example .jpg. In some embodiments, the SVG files are compressed and in some embodiments they are not compressed.

Figure 4:
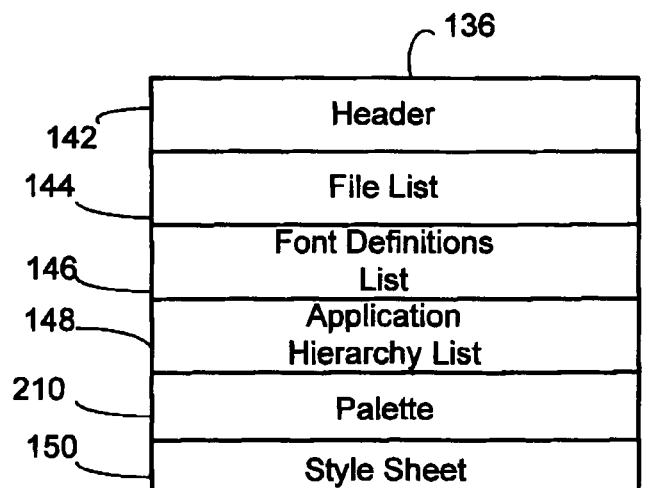
FIG. 4 is a block diagram representation of an example user interface file used in embodiments of the present invention.

The XML theme file 136 includes instructions for creating the UI theme file 130 required by the mobile electronic device 10 to implement an associated user interface theme. Thus, the XML theme file 136 is created by a graphic designer to define the unique visual attributes that specify or make up a user interface theme. With reference to FIG. 4, in one example, the XML theme file includes the following sections: header 142; file list 144; font definitions list 146; application hierarchy list 148; palette 210 and style sheet 150; however such sections are not exclusive and in other embodiments the XML theme file 136 could include additional or fewer sections as required for the interface theme.

The header 142 identifies the user interface theme that is defined by the XML theme file 136. The file list 144 of XML theme file 136 includes a list of all custom graphic image files 134 and SVG files 138 that are required to support the specified user interface theme. The UI Theme compiler 123 uses the file list 144 to identify what graphic image files 134 and SVG files 138 have to be included in the UI theme file 130 to support the associated theme. For example, the file list 144 may include a list of png, .gif and SVG or compressed SVG files, each of which defines custom graphic images required for implementing the associated user interface theme. The font definitions list 146 of XML theme file 136 includes definitions for custom fonts used in the user interface 50. The application hierarchy list 148 defines what application and folder icons 68 and 72 are displayed in a user interface and the relative order of such icons.

Figures 5A, 5B, 6:
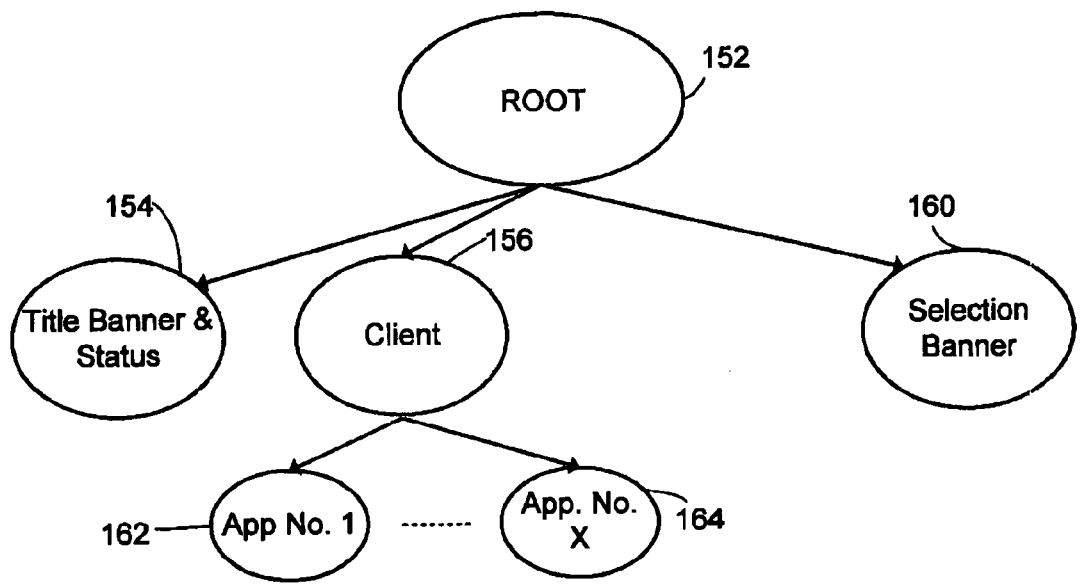
FIGS. 5A and 5B show sample palettes from the example user interface file.
FIG. 6 is a diagrammatic view of an example structure of a style sheet from the example user interface file.

A novel aspect of example embodiments is a palette 210 in the theme file 136. A palette allows a designer to assign specific color value to a predetermined variable string. Thus, the color that is referenced by a string can be defined in the palette 210, which includes a list of predetermined strings, each string being mapped to an associated RGB triplet. By way of example, FIGS. 5A and 5B show examples of two different pallets 210. In the palette 210 of FIG. 5A, the string or variable "primary" is assigned a color value denoted by RGB triplet "#2949E7", and the strings "secondary" and "tertiary" are assigned color values as indicated. In the palette 210 of FIG. 5B, the string or variable "primary" is assigned a different color value denoted by RGB triplet "#FF0000", and the strings "secondary" and "tertiary" are also assigned different color values as indicated. An RGB triplet specifies, through the use of 3 bytes (one for each primary color) the relative amount of Red, Green, and Blue in a color. It will be appreciated by those familiar with RGB triplets that the triplets of the palette of FIG. 6A refer generally to bluer shaded colors, while those of FIG. 6B refer generally to redder shaded colors. "Primary", "secondary" and "tertiary" are examples of some strings that can be used as string variables to which color values are assigned—the strings used to reference color values can be chosen by the theme/palette author as desired.

The style sheet 150 of the XML theme file 136 defines the screen format, layout and foreground and background colors associated with the specified theme. In an example embodiment, the style sheet 150 has a hierarchical parent-child relationship, which is illustrated in a representative manner in FIG. 6. As indicated in FIG. 6, the style sheet defines a default or root theme attribute set 152, and child attributes sets 154, 156 and 160 that define attributes associated with, for example, the title banner and status section 60, the client section 66 and the selection banner 62, respectively. The child attribute sets may themselves be parents to child sets—for example, client attribute set 156 has child sets 162 to 164 associated with each of the applications or folders that can be launched or opened from the client section 66. The attributes in a parent set 152 are applied to the theme-able elements of the user interface unless different attributes are defined in a child set for such theme-able element. A field will inherit attributes from its container. The attribute sets shown in FIG. 6 are not exhaustive, and the style sheet may include other or additional attribute sets. The structure of inheritance can be changed in various embodiments, and will depend dynamically on specified inheritance controls.

FIG. 7 shows an example excerpt from an XML style sheet 150 used to define a themed user interface. Only a few attribute sets are shown in FIG. 7, however the style sheet 150 will commonly define several additional attribute sets for elements of a user interface. As can be seen in FIG. 7 the attribute set 212 defines a foreground color of "black", a background color of RGB triplet "#FFFFFF", a caret foreground color of "white", a background carrot color of "[primary]", a selection foreground color of "black" and a selection background color of "[tertiary]". Thus, colors can be specified in one of at least three ways in the style sheet. In two of the ways shown, the color attribute is hard coded into the style sheet such that the attribute set refers directly to a standard color reference having non-variable value (for example <foreground color="black"/>) or refers directly to a specific RGB triplet (for example <background color="#FFFFFF"/>). However, in the third way shown, the color attribute is soft coded in that it is specified with reference to a string, the color value of which is defined in the palette 210 (for example <background caret=[primary]"/>). Similarly, the other attribute sets 214 and 216 that are shown also define colors by referring to either a string for which an associated color is defined in a palette 210, or by direct reference to a RGB triplet or a standard color. The color attributes that are specified by the string variables that are defined in the palette can easily be changed simply by changing the palette 210. For example, substituting the palette of FIG. 5A with the palette of FIG. 5B in theme file 136 will result in the color attributes specified by the string variables "primary", "secondary", and "tertiary" being changed accordingly. Such a feature allows a designer to easily change the colors specified by a style sheet without changing the style sheet itself. The present style sheet and palette differs from the traditional use of palettes for image compression as, among other things, such traditional paletted images are only able to specify colors from a palette, whereas in the presently described embodiments, only some colors specified in the style sheet are from the palette and other colors are from any in the color-space.

Figure 8:
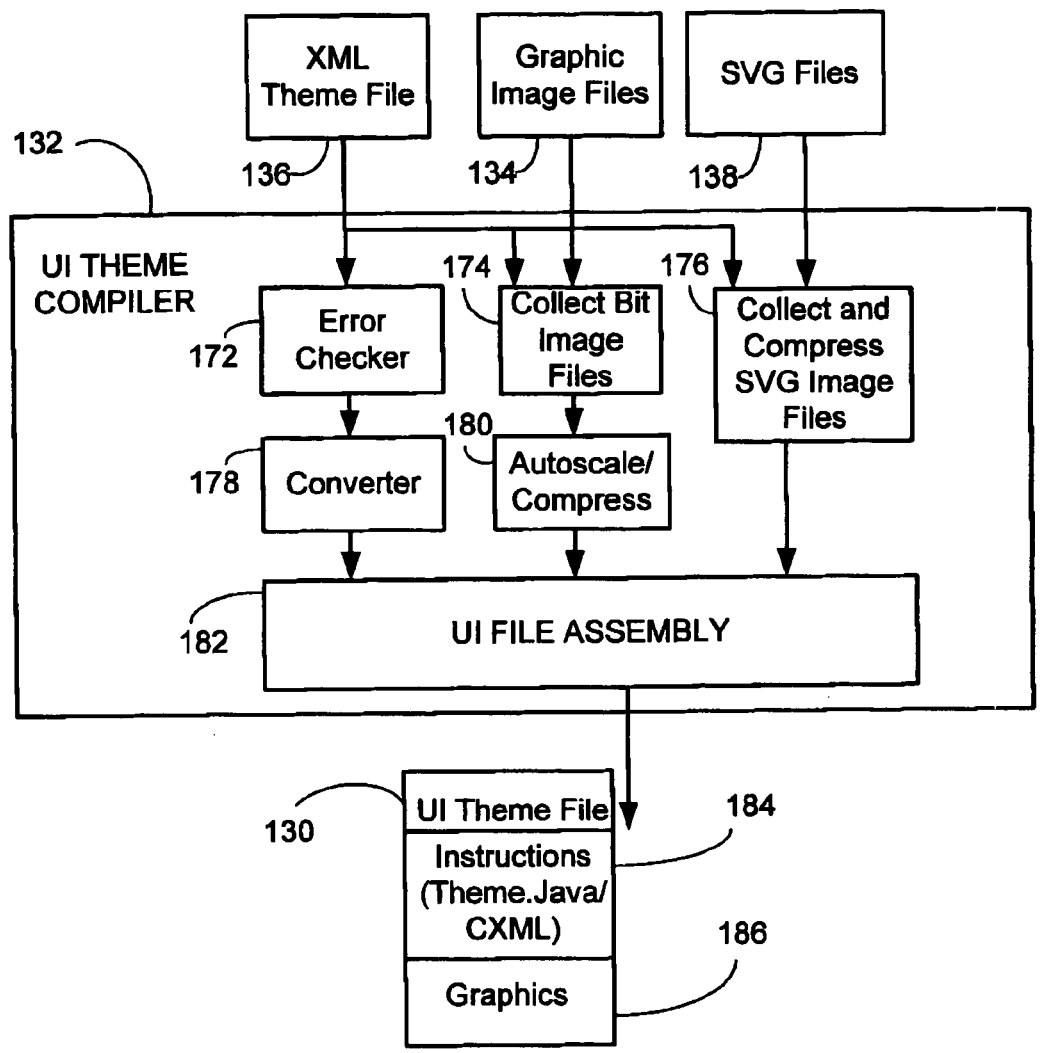
FIG. 8 is a diagrammatic view of an example of a user interface theme compiler of the user interface data provider of FIG. 3.

With reference to FIG. 8, the processing of an XML theme file 136, bit image graphic files 134, and SVG files 138 by UI theme compiler 132 will now be described in greater detail according to example embodiments of the invention. In one example embodiment, the UI theme compiler 132 includes an error checker function 172 that performs error checking on the XML theme file 136 and provides feedback if an error is found. In one example, the error checker function: a) performs a syntactic check of the character strings contained in the XML theme file 136 to determine if they match a predetermined set of acceptable character strings—in other words, a kind of "spell and grammar check"; and b) performs heuristic semantic analysis to determine if specified values fall with acceptable relationships of other specified values—for example, if a foreground and a background color are specified for an element in the style sheet 150, the checker 172 determines by consulting predetermined color relationship tables if the two colors are sufficiently different to be juxtaposed as foreground and background colors.

In some embodiments, the XML theme file 136 may also be subjected to a converter function 178 to put it into a format suitable for use by mobile electronic device 10. In one embodiment, the XML theme file 136 is XSLT (XML Style Language Transform) transformed to a theme JAVA file by converter function 178. In another example embodiment, the XML file is converted to a compressed CXML theme file by converter function 178. The converted file, which will include the same substantive style sheet and palette information as the unconverted file, is then subjected to a UI file assembly function 182. In some example embodiments, converter function 178 is omitted and the XML theme file 136 is not converted or transformed, or is subjected to only minor processing, prior to being passed to UI file assembly function.

The UI theme compiler 132 includes a collect bit image files function 174 for retrieving from a source of binary graphic image files 134 the binary image files that are included in the file list 144 of XML theme file 136, The UI theme compiler 132 also includes a collect and compress SVG image files function 176 for retrieving from a source the SVG files that are included in the file list 144 of XML theme file 136, and, in at least some embodiments, compressing such SVG files. In at least one example embodiment, the retrieved graphic image files 134 are provided to an auto-scaling function 180. Auto-scaling function is configured to create scaled versions of graphics images as required by XML theme file 136.

The UI file assembly function 182 receives the theme file from converter 178, as well as the compressed graphic binary image files and compressed SVG image files, and packages such information into UI theme file 130 for loading onto mobile electronic device 10. The UI theme file 130 includes theme instructions 184 for the mobile electronic device, either in the form of a Theme.java file or a CXML file or a XML file, and graphics files 186, representing graphic image files 134 and SVG files 138, in a form suitable for rendering by mobile electronic device 10. It will be appreciated that in various embodiments, the UI theme file 130 includes the information required to, among other things specify custom attributes such as color, background color, foreground color, background images and font used in various user interface elements. The UI theme file 130, in various embodiments, includes the information for generating various custom applications and folder icons, including varying sizes of the custom icons (for example, small, regular and large versions), and for generating normal, focused and selected states of such icons. In various embodiments, UI theme file 130 includes the information for generating other custom images such as check boxes, radio buttons, navigation images such as scroll arrows, and status icons.

Processing of UI theme file 130 by mobile electronic device 10 will now be discussed in greater detail. Referring again to FIG. 1, the mobile electronic device 10 includes UI theme manager software for implementing a UI theme manager 73. In one embodiment the UI theme manager is implemented on a JAVA runtime layer of the device 10. Various functions of the UI theme manager could, in various embodiments, be performed by operating system 54 and/or other software applications 58. The mobile electronic device 10 also includes a data storage 75 for storing graphics and other files.

Figure 9:
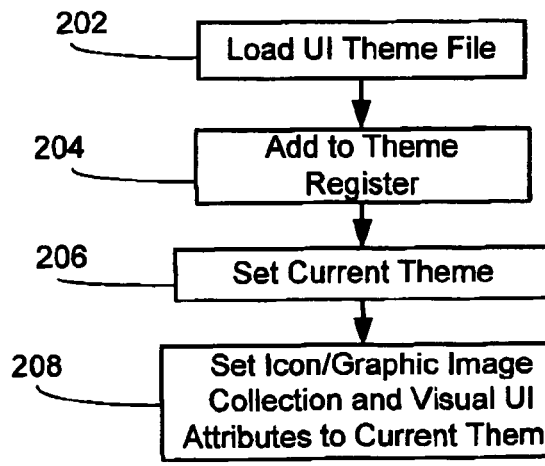
FIG. 9 is a block diagram showing processing of a user interface theme file by a mobile electronic device.

In one example embodiment, the mobile electronic device 10 is provided with an initially installed set of default user interface attributes. The UI theme manager 73 is configured to use such attributes unless instructed otherwise. The UI theme manager maintains a list or register of selectable themes for which the corresponding UI theme files 130 have been loaded on the device. FIG. 9 shows an example process by which a UI theme file 130 is processed at mobile electronic device 10. As indicated in step 202, a specified UI theme file 130 is first loaded onto the device 10. Such loading can occur in a variety of different ways. For example, in one embodiment a carrier or manufacturer preloads one or more UI theme files 130 onto the device 10 prior to delivery to an end user. Alternatively, the mobile electronic device 10 may download the UI theme file 130 over wireless network 110. The UI theme file 130 may be loaded on the mobile electronic device 10 through its short range communications system 40, or its serial port 30. When downloaded over wireless network 110 or otherwise, the UI theme file 130 may originate at a UI data provider system 125 located on the Internet.

The mobile electronic device 10 may be configured to automatically download, on device activation or at predetermined intervals or upon prompting, over wireless network 110 and WAN 120 from a specified Web address one or more specified UI theme files 130. Alternatively, the downloading of a UI theme file 130 could be user initiated, with the user downloading, perhaps upon payment of a monetary amount, a UI theme file 130 associated with a theme desired by the user.

The UI theme manager 73 is made aware of the presence of a new UI theme file 130 once it is downloaded, and as indicated in Step 204, the new theme is added to a list or register of selectable UI themes. Such register may include one or more selectable themes. In an embodiment where the UI theme file 130 includes instructions in the form of a theme-.java file, the file self-executes upon downloading and advises the theme manager 73 of its presence. In an embodiment where the instructions are in the form of a CXML or XML file, a file download manager may be configured to detect the presence of the theme file and advise the theme manager. The graphics files and instructions, including palette 210 and style sheet 150 associated with the UI theme file 130 are stored in data store 75.

As indicated in step 206, the UI theme manager is configured to set a current user interface theme. In one embodiment, the user can specify a current theme from among the themes included in the theme register. In other embodiments, the current theme may be automatically or default selected.

As indicated in step 208, once a theme has been selected as a current theme, the UI theme manager 73 maintains in memory an icon/graphic image collection specified by the instructions associated with the current theme, as well as the current visual user interface attributes associated with the theme. Elements that are displayed on the screen have the visual attributes specified by the current theme applied to them. Icons and other graphic images that are displayed are selected from the theme icon/graphic image collection.

A theme file 130 may specifically reference another theme file from which attributes not specifically set in the newly selected theme file are to be inherited, or may by default inherit attributes from the previously selected theme file. Thus, the style sheet 150 in a theme file could be quite short, and in some cases a theme file 130 may substantially include only a header, a new palette 210, and a reference to another theme file already stored on device 10, in which case the effect of selecting the new theme file would substantially be to replace the colors specified by string variable in the referenced theme file with the new color values set in the palette 210 of the new theme file. Accordingly, the palettes 210 of the above-described embodiment allow colors of an existing user interface theme to be modified with relative ease.

In some embodiments gradient areas can be created by taking a greyscale representation, negate it, then using it as the alpha channel to a solid color indicated by one of the palette entries. This has the effect that black becomes the fully saturated color, white remains white, and intermediate greys become intermediate blends of white and the palette color.

Clearly, white can be replaced with any background color. This technique would support irregular gradient areas. Regular gradient areas could also be implemented by this technique, as long as only 2 colors are blended. Contrarily, regular gradients, for example a linear gradient or radial gradient, could be generated programmatically using techniques available in the art with possibly one or more of the reference points specified from the palette.

The above-described embodiments of the present invention are intended to be examples only. Alterations, modifications and variations may be effected to the particular embodiments by those skilled in the art without departing from the scope of the invention, which is defined by the claims appended hereto.

We claim:

1. A method of defining colors for a graphical user interface on a mobile electronic device, the graphical user interface controlling the operation of the mobile electronic device, the graphical user interface having a plurality of interface elements each having visual attributes, the method comprising:
   providing on the mobile electronic device a first theme file comprising a first color palette list and a first style sheet,
   the first color palette list including a plurality of variable strings each of which has an assigned color value,
   the first style sheet specifying color attributes of at least some of the interface elements, at least one of the color attributes of at least one of the interface elements being specified by reference to one of the variable strings;
   providing on the mobile electronic device a second theme file comprising a second color palette list,
   the second color palette list including a plurality of variable strings each having an assigned color value, wherein the variable strings of the second color palette list are the same as the variable strings of the first color palette list, wherein at least one of the variable strings of the second color palette list have different color values than the corresponding variable strings in the first color palette list,
   wherein the second theme file references the first theme file so as to inherit at least some of the visual attributes of the first theme file;
   generating the graphical user interface on a display of the mobile electronic device in accordance with the first theme file, wherein the at least one of the color attributes of the interface elements is specified by reference to one of the variable strings of the first color palette list;
   receiving a selection of the second theme file; and
   re-generating the graphical user interface on the display of the mobile electronic device in accordance with the second theme file in response to the selection, wherein the at least one of the color attributes of the interface elements is specified by reference to one of the variable strings of the second palette list.

2. The method of claim 1, wherein re-generating the graphical user interface comprises re-displaying the graphical user interface with the color attributes of the interface elements specified by reference to the variable strings of the first color palette list replaced with different color attributes specified by the same variable strings in the second palette list.

3. The method of claim 1, wherein the color values assigned to the variable strings comprise RGB triplet values.

4. The method of claim 3, wherein the variable strings comprise a primary color string representing a primary color of the graphic user interface, a secondary color string representing a secondary color of the graphic user interface, and a tertiary color string representing a tertiary color of the graphic user interface, each of the primary, secondary and tertiary color strings having assigned different RGB triplet values.

5. The method of claim 1, wherein at least one of the color attributes of at least some of the interface elements of the first style sheet are specified by direct reference in the first style sheet to a color.

6. The method of claim 1, wherein the color attributes of the interface elements of the first style sheet are defined by one of: a standard color reference having a non-variable value, an RGB triplet, and a reference to one of the variable strings.

7. The method of claim 1, wherein the color attributes include foreground and background color attributes.

8. The method of claim 1, wherein providing the first theme file onto the mobile electronic device includes pre-loading the first theme file onto the mobile electronic device prior to a delivery of the mobile electronic device to an end user.

9. The method of claim 1, wherein the second theme file is downloaded onto the mobile electronic device over a wireless network to the mobile electronic device.

10. The method of claim 9, wherein the second theme file self-executes upon being downloaded onto the mobile electronic device.

11. The method of claim 1, wherein the mobile electronic device is enabled for wireless communications and the second color palette list comprises color values to customize the graphical user interface to a color scheme set by a carrier that operates a home wireless network of the mobile electronic device.

12. A mobile electronic device, comprising:
   a processor;
   a display screen connected to the processor for displaying a graphical user interface for controlling the operation of the mobile electronic device, the graphical user interface having a plurality of interface elements each having visual attributes;
   a user input device connected to the processor for receiving input;
   a storage connected to the processor;
   a first theme file stored on the storage comprising a first color palette list and an instruction set,
   the first color palette list including a plurality of variable strings each of which has an assigned color value,
   the instruction set specifying color attributes of at least some of the interface elements, at least one of the color attributes of at least one of the interface elements being specified by reference to one of the variable strings;
   a second theme file stored on the storage comprising a second color palette list,
   the second color palette list including a plurality of variable strings each having an assigned color value, wherein the variable strings of the second color palette list are the same as the variable strings of the first color palette list, wherein at least one of the variable strings of the second color palette list have different color values than the corresponding variable strings in the first color palette list;
   wherein the second theme file references the first theme file so as to inherit at least some of the visual attributes of the first theme file;
   a theme manager associated with the processor which is configured to: generate the graphical user interface on a display of the mobile electronic device in accordance with the first theme file, wherein the at least one of the color attributes of the interface elements is specified by reference to one of the variable strings of the first color palette list; receive a selection of the second theme file through the user input device; and re-generate the graphical user interface on the display of the mobile electronic device in accordance with the second theme file in response to the selection, wherein the at least one of the color attributes of the interface elements is specified by reference to one of the variable strings of the second palette list.

13. The mobile electronic device of claim 12, wherein the instruction set specifies at least some of the color attributes by direct reference to a color.

14. The mobile electronic device of claim 12, wherein the color palette list assigns each of the string variables an RBG triplet representing a color.

15. The mobile electronic device of claim 12, wherein the color attributes of the interface elements of the instruction set are defined by one of: a standard color reference having a non-variable value, an RGB triplet, and a reference to one of the variable strings.

16. The mobile electronic device of claim 12, wherein the color attributes include foreground and background color attributes.

17. The mobile electronic device of claim 12, wherein the instruction set is a style sheet.

18. The mobile electronic device of claim 12, wherein the variable strings comprise a primary color string representing a primary color of the graphic user interface, a secondary color string representing a secondary color of the graphic user interface, and a tertiary color string representing a tertiary color of the graphic user interface, each of the primary, secondary and tertiary color strings having assigned different RGB triplet values.

19. The mobile electronic device of claim 12, wherein the mobile electronic device is a wireless communications device, the second color palette list comprises color values to customize the graphical user interface to a color scheme set by a carrier that operates a home wireless network of the mobile electronic device.

20. The mobile electronic device of claim 12, wherein the theme manager is configured, when re-generating the graphical user interface, to re-display the graphical user interface with the color attributes of the interface elements specified by reference to the variable strings of the first color palette list replaced with different color attributes specified by the same variable strings in the second palette list.

21. A computer program product having a non-transitory computer-readable medium tangibly embodying computer executable instructions for defining colors for a graphical user interface on a mobile electronic device, the graphical user interface controlling the operation of the mobile electronic device, the graphical user interface having a plurality of interface elements each having visual attributes, the computer program product comprising:
  a first theme file comprising a first color palette list and a first style sheet,
  the first color palette list including a plurality of variable strings each of which has an assigned color value,
  the first style sheet specifying color attributes of at least some of the interface elements, at least one of the color attributes of at least one of the interface elements being specified by reference to one of the variable strings;
  a second theme file comprising a second color palette list,
  the second color palette list including a plurality of variable strings each having an assigned color value, wherein the variable strings of the second color palette list are the same as the variable strings of the first color palette list, wherein at least one of the variable strings of the second color palette list have different color values than the corresponding variable strings in the first color palette list,
  wherein the second theme file references the first theme file so as to inherit visual attributes of the first theme file;
  instructions for generating the graphical user interface on a display of the mobile electronic device in accordance with the first theme file, wherein the at least one of the color attributes of the interface elements is specified by reference to one of the variable strings of the first color palette list;
  instructions for receiving a selection of the second theme file; and
  instructions for re-generating the graphical user interface on the display of the mobile electronic device in accordance with the second theme file in response to the selection, wherein the at least one of the color attributes of the interface elements is specified by reference to one of the variable strings of the second palette list.

* * * * *